Dec. 27, 1927.                                                                        1,653,932
W. J. SHAW
MACHINE FOR GROOVING WOOD HEELS
Filed July 16, 1923                             4 Sheets-Sheet 1

Inventor
Wesley J. Shaw
by David Rines
Attorney

Patented Dec. 27, 1927.

1,653,932

UNITED STATES PATENT OFFICE.

WESLEY J. SHAW, OF HAVERHILL, MASSACHUSETTS, ASSIGNOR TO NEW ENGLAND WOOD HEEL CO., OF HAVERHILL, MASSACHUSETTS, A CORPORATION OF MASSACHUSETTS.

MACHINE FOR GROOVING WOOD HEELS.

Application filed July 16, 1923. Serial No. 651,966.

The present invention relates more particularly to machines for grooving wood blocks intended to be manufactured into wood heels. Some features of the invention are, however, of more general application.

The nature and the objects of the invention will be better understood in connection with the accompanying drawings, in which.

Figure 8:
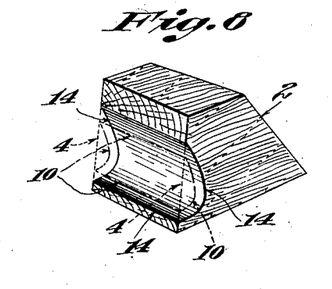
Fig. 8 is a perspective view of a wood-heel block.

The machine that has been chosen to illustrate the invention, as required by the statutes, is adapted to operate upon wood-heel blocks 2. One such block is illustrated in Fig. 8 as provided with upper and lower oppositely disposed faces and two side oppositely disposed faces. To start with, before it is operated upon in the illustrative machine, it has the shape indicated by the dotted lines 4. Blocks of this shape are placed upon an endless carrier 6, with a portion thereof projecting at one side of the carrier, and are advanced by the carrier to a rotating cutter 8, by which the projecting portions of the blocks are successively cut along the dot-and-dash lines 10, shown in Fig. 8. The carrier 6 continues to advance the blocks to a second cutter 12, which cuts the full-line groove 14, Fig. 8. The groove 14 may, of course, be cut in one step instead of two, but it is found better, in practice, to groove the block in at least two steps. The chief object of the invention is to provide an improved machine for grooving wood-heel blocks. Other objects will appear in the course of the following description.

Figure 1:
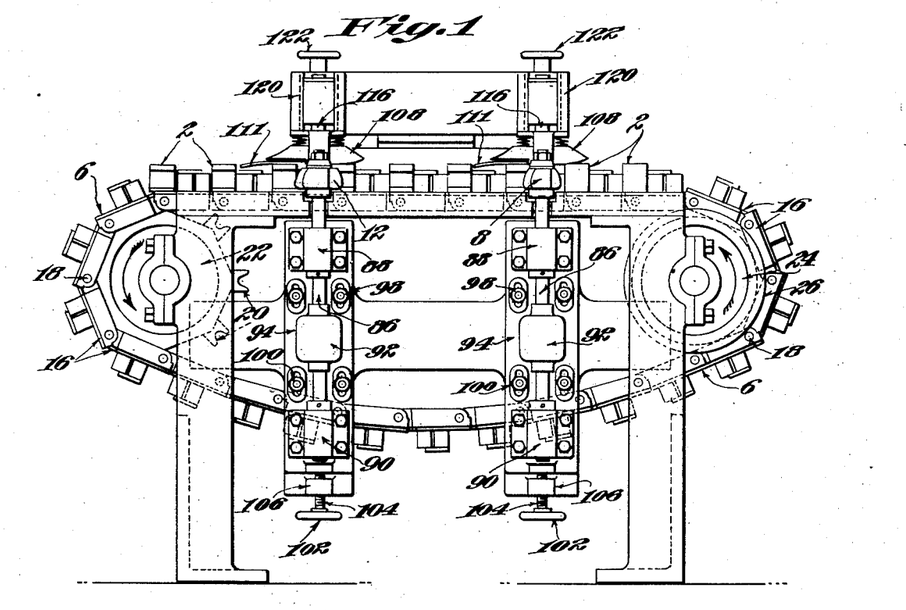
Fig. 1 is a diagrammatic view, in front elevation, illustrating one embodiment of the invention.
Figure 2:
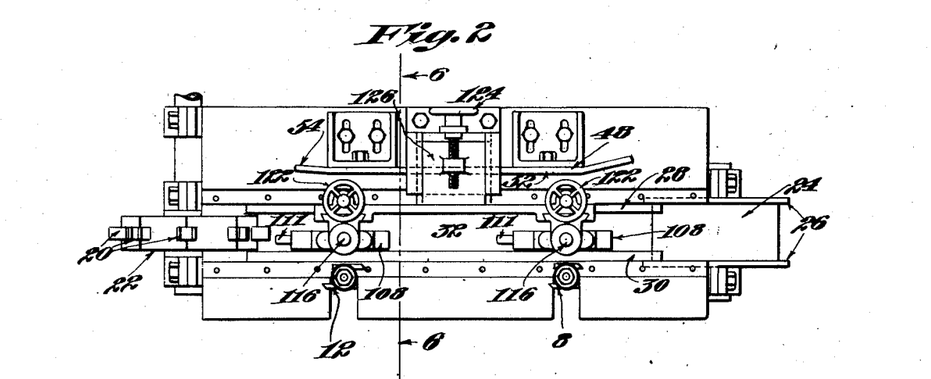
Fig. 2 is a plan of the same, with parts omitted for clearness.
Figure 4:
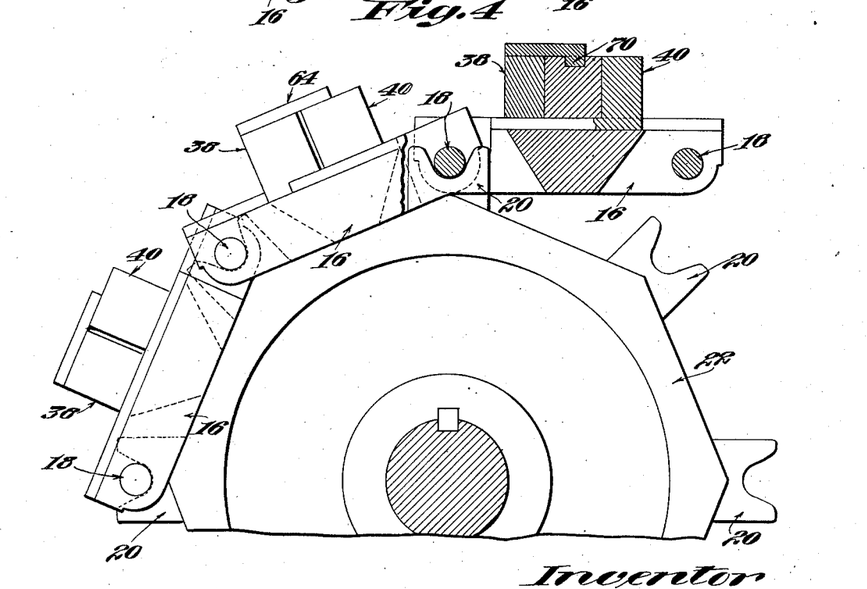
Fig. 4 is a similarly enlarged elevation, partly in section, of the extreme left-hand portion of the machine, as viewed in Figs. 1 and 2.

The endless carrier 6 comprises a plurality of links 16 connected by pintles 18 that are adapted to be engaged by teeth 20 of a driving wheel 22 over which the carrier 6 is mounted. The driving wheel 22 may be driven from any desired source of power (not shown). The driving wheel 22 is shown in Figs. 1 and 2 at the left-hand end of the machine. The carrier 6 is mounted also over an idler wheel 24 at the right-hand end of the machine. The idler wheel 24 is provided with a circular periphery and with flanges 26 between which the links of the carrier 6 are confined. The periphery of the driving wheel 22, however, is flat-sided, as shown more particularly in Figs. 1 and 4, in order that the links 16 may rest snugly against the sides thereof while the teeth 20 engage the pintles 18 to drive the carrier 6. The carrier travels on substantially straight tracks 28 and 30 located at the sides of an opening 32 in the frame of the machine, over which opening the carrier is suspended. This construction involves less friction than if the carrier dragged over a solid bed bottom. The substantially straight tracks 28 and 30 ensure that the portion of the path of travel of the carrier between the driving wheel 22 and the idler wheel 24 shall be substantially straight. In order to prevent vibration of the carrier during its travel, it is confined on one side between the track 28 and a ledge 34, and on the other side between the track 30 and a ledge 36. The ledges 34 and 36 may be secured to the frame of the machine in any desired manner, as by means of screws 37, Fig. 5.

The blocks must, of course, be firmly clamped in position during their travel to and by the cutters. According to the preferred embodiment of the present invention, the clamping is effected by means of clamping jaws that are mounted upon the carrier so as to move with the carrier. The clamping jaws are arranged in cooperating pairs, and a block is adapted to be clamped between each cooperating pair of jaws. Two jaws are mounted upon each link of the carrier, each jaw being one of a pair of cooperating jaws, the other jaw of each pair being mounted one on each adjacent link. As the pairs of jaws are substantially alike, it will suffice to describe one pair of jaws only.

Figure 3:
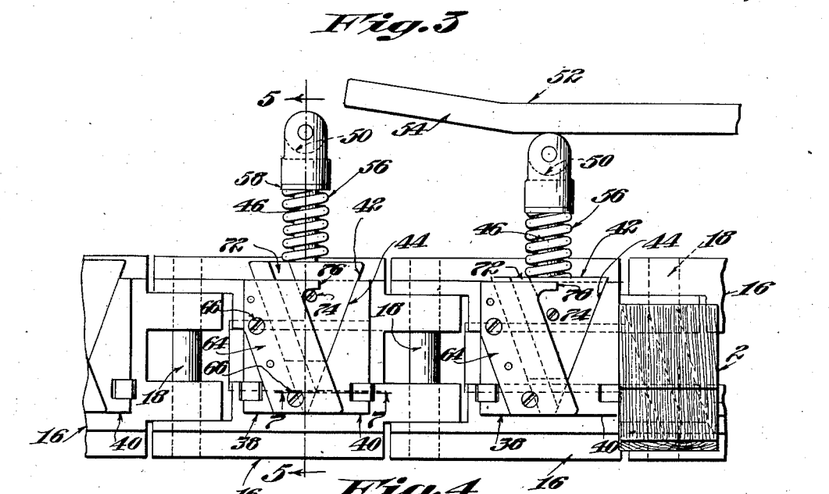
Fig. 3 is a plan of a detail, shown enlarged with respect to Figs. 1 and 2.

Each cooperating pair of jaws comprises one jaw 38 that is stationary with respect to the carrier 6, and one jaw 40 that is movable with respect to the carrier in the direction of the path of travel of the carrier. The jaws 38 and 40 are normally separated from each other by a distance greater than the width of a heel block, and the movable jaw is moved towards the stationary jaw to clamp the block between them. Referring to Fig. 3, for example, the movable jaw 40 that is mounted upon one link 16 may be moved along the said one link 16 towards the stationary jaw 38 that is mounted upon the next adjacent link 16 to effect between them the clamping of a block that is resting on the carrier. In the specific embodiment of the invention that is herein illustrated and described, this is effected by means of a wedge 42, acting upon a wedge face 44 that is provided upon the rear side of the jaw 40. By forcing the wedge 42 transversely to the direction of travel of the carrier, the jaw 40 may be forced towards the jaw 38.

Figure 5:
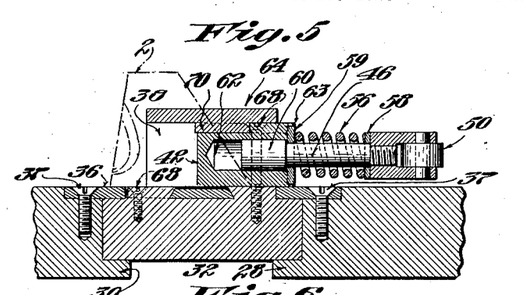
Fig. 5 is a transverse vertical section taken upon the line 5—5 of Fig. 3, looking in the direction of the arrows.
Figure 6:
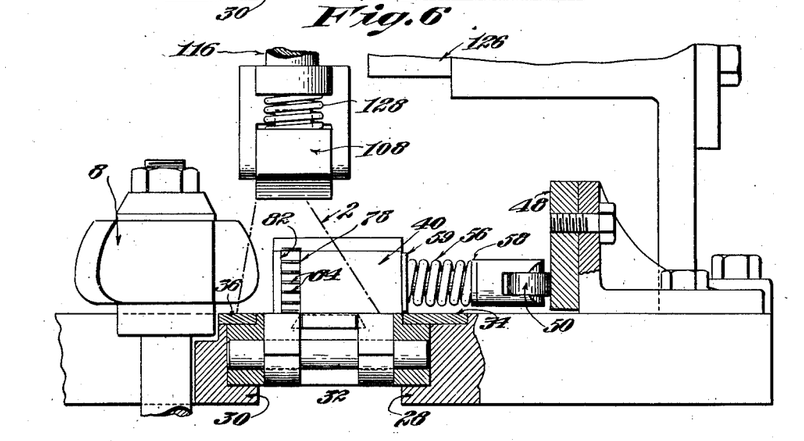
Fig. 6 is a similarly enlarged view, partly in elevation, and partly in transverse vertical section along the line 6—6 of Fig. 2, looking in the direction of the arrows.

The movable jaw 40 is adapted to be actuated towards the stationary jaw 38 to effect the clamping of the block 2 between the jaws by an arm 46 that is mounted upon the wedge 42, and that extends beyond and to one side of the carrier, in substantially the plane of the substantially straight path of the carrier, as is illustrated more particularly in Fig. 5. The actuation is effected automatically during the travel of the carrier, and at a time when the jaws 38 and 40 are positioned along the substantially straight portion of the path, by a cam 48 that is adapted to be engaged by a roller 50 at the free end of the arm 46. The cam 48 is located to one side of the carrier, as will be understood by referring more particularly to Fig. 2, at a predetermined position in the path of travel of the carrier in advance of the cutter 8, such that the clamping effect may be obtained after the block has been placed upon the carrier, and before it has been advanced to the cutter 8. The cam 48 is shown as an inclined plane. During the travel of the carrier from right to left, as viewed in Fig. 2, at a predetermined position in advance of the cutter 8, therefore, the arm 46 is pressed gradually transversely inward towards the carrier, causing the wedge 42 to force the movable jaw 40 towards the stationary jaw 38, and causing the block 2 to become clamped between the jaws, as before described. By the time that the block has been advanced as far as the cutter 8, therefore, it has become firmly clamped in position upon the carrier.

A wall 52 that forms an extension of the cam 48 maintains the arm 46 in position, to maintain the block clamped between the jaws, until after the block has been advanced beyond the cutter 12. An outwardly diverging cam 54 of the wall 52, located at a predetermined position beyond the cutter 12, permits the arm 46 to return gradually to its normal position, and the jaws to release the block. Though the jaws move with the carrier on both the upper and lower levels of the carrier, therefore, they are positioned in clamping engagement with the heel block during their travel only between limits on the upper level. The angle that the cam 54 makes with the wall 52 is less abrupt than that made by the cam 48, in order not to permit the jaws to unclamp the block too suddenly after the block has been acted upon by the cutter.

As the blocks 2 are not all of the same dimension, provision should be made for advancing the jaw 40 sometimes a little farther towards the jaw 38 and sometimes not quite so far. Blocks of different thickness will, in that manner, be clamped with equal effectiveness. To bring about this result, according to the preferred embodiment of the present invention, the arm 46 is not rigid with, but is slidable upon, the wedge 42, but is maintained in nearly rigid relationship therewith by a stiff coil spring 56 that causes the roll 50 to ride along and in engagement with the wall 52. The arm 46 extends through the coil spring 56. One end of the spring bears against a shoulder 58 of the arm 46, and the other end bears against a plate 59 of the wedge 42. The arm 46 is thus maintained pressed outward, as is illustrated more particularly in Fig. 5. The arm 46 extends through the plate 59, and its inner portion 60 is adapted to slide, piston-like, in a bore 62 of the wedge 42, in opposition to the force exerted by the spring 56. An annular shoulder 63 of the portion 60 of the arm 46 engages the plate 59 to prevent the arm 46 becoming separated from the wedge 42. This construction permits the cam 48 not only to advance the wedge 42, but to compress the spring 56, more or less, as well, thereby providing for clamping blocks of different thickness. The spring action is more gradually released when the roll 50 reaches the cam portion 54 of the wall 52 than it is rendered effective by the cam 48, so that the jaws are resiliently released from the blocks less suddenly than they are clamped, as before described. The clamping action is positive, notwithstanding the use of the spring 56, because of the above-described, nearly rigid relationship between the arm 46 and the wedge 42.

The wedge 42 is confined against up-and-down movement, and is guided in its transverse movement across the link 16 of the carrier 6 upon which it is mounted, by a plate 64 that is parallel to the link 16. The plate 64 is shown secured to the body portion of one jaw 38 of another pair of jaws 38, 40 by screws 66. The said jaw 38 is secured, in its turn, to the corresponding link, by a screw 68, Fig. 5. The under side of the plate 64 is integrally provided with a diagonally extending rib 70, Fig. 4, that fits into a corresponding groove 72 provided upon the upper face of the wedge 42, to guide the transverse movement of the wedge 42. An upstanding screw 74 is adapted to engage a projecting lug 76 of the plate 64 to prevent the wedge 42 from accidentally becoming displaced from under the plate 64. The movable jaw 40 is also slidably confined between the link 16 and the plate 64.

Figure 7:
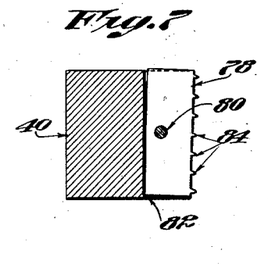
Fig. 7 is a section taken upon the line 7—7 of Fig. 3, looking in the direction of the arrows, shown enlarged with respect to Fig. 6.

Not only do the blocks 2 vary in thickness, but their thickness is not always uniform, being sometimes thicker at the bottom, for example, than at the top. To secure a firm clamping action notwithstanding this kind of variation, the jaws 38 and 40, or either of them, may be provided with self-alining clamping faces 78, shown more particularly in Fig. 7. The clamping faces 78 comprise plates freely pivoted at 80 in grooves 82 of the jaws upon which they are mounted. When the movable jaw 40 is forced towards the stationary jaw 38, therefore, the self-alining clamping face or faces 78 will automatically grip the block 2 throughout the height of the block, whether the sides of the block are upright or inclined. In order to provide for a more secure gripping action, the clamping faces 78 are provided with teeth 84.

The position of the groove 14 upon the block 2 will depend upon the height of the cutters. The cutters should be situated substantially in the plane of movement of, and to one side of the path of travel of, the jaws, or slightly above the links, at intermediate positions of the carrier 6, as illustrated more particularly in Fig. 7. The cutters are mounted upon spindles 86 that rotate in bearings 88 and 90 and are driven by motors 92. The spindles 86, bearings 88 and 90 and motors 92 are mounted as a unit upon plates 94, and the plates are vertically adjustable. The plates 94 may be secured in vertically adjusted position by bolts 98 extending through elongated openings 100. The vertical adjustment may be facilitated by hand wheels 102 secured to threaded stems 104 that extend through lugs 106 in the frame of the machine and that engage the plates 94.

In order to control accurately the position of the groove 14 upon the block 2, it is also necessary to have the block rest snugly on the carrier. If the block is raised even slightly above the carrier, the groove will be cut too low. Provision is therefore made for holding the block tightly against the carrier during the clamping movement of the movable jaw 40.

Figure 9:
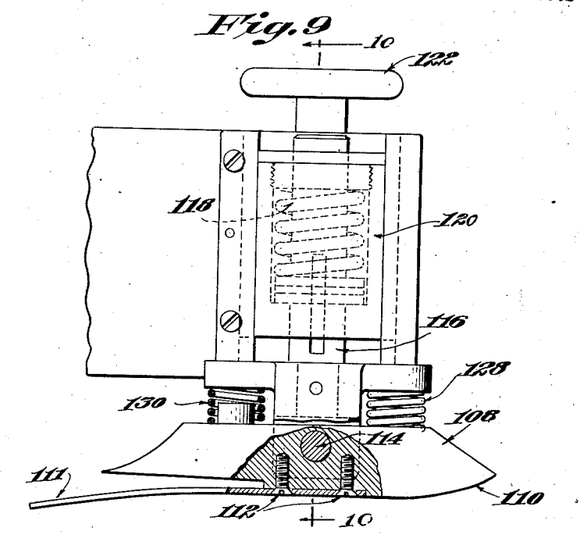
Fig. 9 is a front elevation, partly in section, of a detail, the scale being the same as in Fig. 6.

To this end, the block 2, after it has been positioned on the carrier, is caused to travel under a shoe 108 that presses down firmly against the block. The forward portion of the shoe 108 is bevelled, as shown more particularly at 110, Fig. 9, so that the block may enter thereunder the more readily. As the block is carried forward by the carrier, it is caused to travel under the shoe. The movable jaw is caused to clamp the block at this time. At the time that the block is presented to the cutter, therefore, it is held snugly at its lower and upper faces both below and above the cutter, and is at the same time clamped between the jaws at its two side faces, the cutter acting at a point intermediate between the carrier below and the shoe above, and to one side of the carrier and the shoe. During the further advance of the block by the carrier, after the block has become clamped, the holding action of the shoe is no longer needed, and the carrier therefore advances the block beyond the range of action of the shoe, so as to cause the shoe to release the block. The shoe continues its holding action, however, until after the cutter has cut the groove, so that the block is at this time clamped on all four sides. Two shoes 108 are provided, one for each of the cutters, as will be clear from the showing of Figs. 1 and 2. It will be unnecessary to describe more than one, as they are substantially alike. In order that the release of the block by the shoe may be gradual, the forward portion of the shoe is provided with a spring arm 111 that may be secured to the underside of the shoe in any desired manner, as by means of screws 112.

Figure 10:
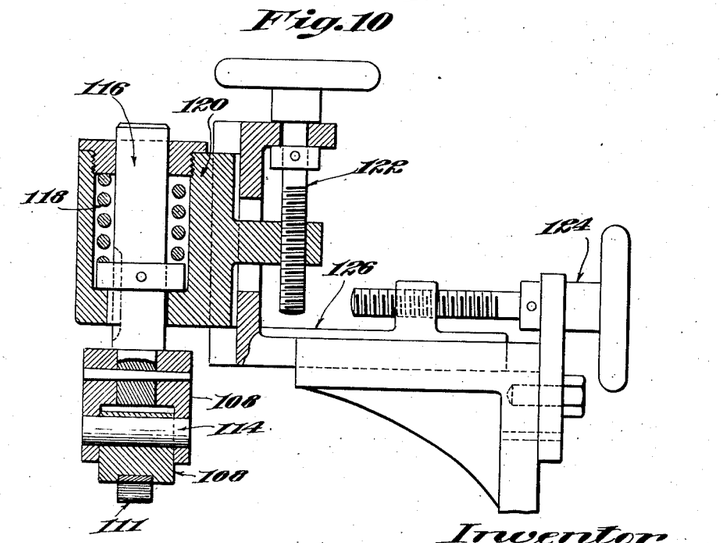
Fig. 10 is a similarly enlarged elevation, partly in section upon the line 10—10 of Fig. 9, looking in the direction of the arrows.

The shoe 108 is intermediately pivoted at 114 upon a plunger 116. The plunger is vertically yieldable, in opposition to the action of a coil spring 118, in order to allow for blocks of different height. The plunger is mounted upon a framework 120 that is vertically adjustable by means of a handwheel 122. Transverse adjustment may be effected by means of a handwheel 124 that is adapted to control the transverse adjustment of a slide 126 that carries the framework 120, as shown more particularly in Fig. 10.

The pivotal movement of the shoe 108 about the pivotal point 114 is yieldingly resisted by two coil springs 128 and 130 mounted between the framework 120 and the shoe on each side of the pivot. When a block is forced under the shoe, the spring 128 is first compressed. The spring 130 is compressed later, as the block is advanced beyond the shoe. The spring 118 is called into play for blocks of extra thickness.

No attempt is made herein to illustrate or describe the many changes and modifications that may be made within the spirit and scope of the invention. Such modifications and changes will readily occur to persons skilled in the art. It will therefore be understood that the machine illustrated and described herein is illustrative only, and that the invention is not restricted thereto, but is defined by the appended claims. It is intended to cover in the appended claims all the novelty that the invention may possess, and it is therefore desired that the claims be broadly construed, except in so far as it may be necessary to impose limitations because of prior art.

What is claimed is:

1. A machine of the class described having, in combination, a carrier comprising a plurality of links, two clamping jaws mounted upon each link of the carrier so as to move with the carrier, one of each of the said two jaws being stationary with respect to the carrier and the other of each of the said two jaws being movable with respect to the carrier towards the stationary jaw upon another link, means for actuating the carrier along a path a portion of which is substantially straight, and means situated at one side of the carrier in substantially the plane of the substantially straight path and operable during the actuation of the carrier to move the movable jaws towards the corresponding stationary jaws to effect the clamping of blocks between the jaws, whereby the carrier is adapted to advance clamped blocks, the last-named means being operable to move the movable jaws towards the corresponding stationary jaws when the movable jaws are positioned along the substantially straight portion of the path.

2. A machine of the class described having, in combination, a cutter, an endless carrier comprising a plurality of links, clamping jaws mounted in pairs upon the carrier so as to move with the carrier, one of the jaws of each pair being stationary with respect to the carrier and the other jaw of each pair being movable with respect to the carrier in the direction of the path of travel of the carrier and having a wedge face, a wedge adapted to engage the wedge face to effect the actuation of the movable jaw, means for actuating the carrier, and means operable during the actuation of the carrier to actuate the wedge against the wedge face to effect the clamping of a block between the jaws, whereby the carrier is adapted to advance a clamped block to the cutter.

3. A machine of the class described having, in combination, a cutter, an endless carrier comprising a plurality of links, two clamping jaws mounted upon each link of the carrier so as to move with the carrier, one of each of the said two jaws being stationary with respect to the carrier and the other of each of the said two jaws being movable upon the link upon which it is mounted in the direction of the path of travel of the carrier towards the stationary jaw upon another link, the movable jaw having a cam face, a cam adapted to engage the cam face to effect the actuation of the movable jaw having an arm, means for actuating the carrier, means operable during the actuation of the carrier for engaging the arm to effect the clamping of a block between the movable jaw and the said stationary jaw upon the said other link, whereby the carrier is adapted to advance a clamped block to the cutter, and means operable during the actuation of the carrier for unclamping the block after the block has been acted upon by the cutter.

4. A machine of the class described having, in combination, a cutter, an endless carrier comprising a plurality of links for advancing blocks to the cutter, a jaw fixed upon each link, a jaw movably mounted upon each link and adapted to clamp a block against a stationary jaw of another link, the cutter being situated at an intermediate position of the carrier in the plane of movement of the carrier, means for actuating the carrier, means situated at one side of the carrier at a predetermined position in advance of the cutter for actuating the movable jaws of each link to clamp blocks against the stationary jaws of the said other links, whereby the blocks are clamped when they are advanced to the cutter, and means operable at a predetermined positioned beyond the cutter for actuating the movable jaws to unclamp the blocks after the blocks have been acted upon by the cutter.

5. A machine for grooving heel blocks having, in combination, a carrier, clamping jaws mounted upon the carrier so as to move with the carrier, means for actuating the carrier, means for relatively moving the jaws in the direction of the path of travel of the carrier so as to cause a heel block resting on the carrier to become clamped between the jaws, means between which and the carrier the block is firmly held against the carrier during the relative movement of the jaws, and a heel-block-grooving cutter situated at one side of the path of travel of the clamping jaws intermediately between the last-named means and the carrier, whereby the carrier is adapted to advance to the cutter a heel block resting snugly upon the carrier and clamped between the jaws, and the cutter is adapted to cut a groove in the block at a point at one side of the carrier and the said last-named means.

6. A machine of the class described having, in combination, a cutter, a carrier, clamping jaws mounted upon the carrier so as to move with the carrier, means for actuating the carrier along a path a portion of which is straight, means situated at one side of the carrier in substantially the plane of the substantially straight path and operable during the actuation of the carrier when the jaws are positioned along the substantially straight portion of the path for relatively moving the jaws in the direction of the path of travel of the carrier so as to cause a block resting on the carrier to become clamped between the jaws, and means for holding the block against the carrier during the said relative movement of the jaws, whereby the carrier is adapted to advance to the cutter a block resting snugly upon the carrier and clamped between the jaws.

7. A machine of the class described having, in combination, a cutter, a carrier, clamping jaws mounted upon the carrier so as to move with the carrier, means for actuating the carrier along a path a portion of which is substantially straight, means situated at one side of the carrier in substantially the plane of the substantially straight path and operable at a predetermined position in advance of the cutter when the jaws are positioned along the substantially straight portion of the path for relatively moving the jaws in the direction of the path of travel of the carrier so as to cause a block resting on the carrier to become clamped between the jaws, means for holding the block against the carrier during the said relative movement of the jaws, the holding means being adapted to release the block after it has been clamped between the jaws, whereby the carrier is adapted to advance to the cutter a block resting snugly upon the carrier and clamped between the jaws, and means operable at a predetermined position beyond the cutter for unclamping the block after it has been acted upon by the cutter.

8. A machine for grooving heel blocks having, in combination, a heel-block-grooving cutter, a carrier, clamping jaws mounted upon the carrier so as to move with the carrier, one of the jaws being movable in the direction of the path of travel of the carrier to effect the clamping between the jaws of a heel block resting on the carrier, the said jaw having an arm extending beyond and to one side of the carrier, means for actuating the carrier, means located at a predetermined position in the path of travel of the carrier for engaging the arm to effect the clamping movement of the jaw, and means for firmly holding the block against the carrier during the said clamping movement of the jaw, the holding means being adapted to release the block after it has been clamped between the jaws, whereby the carrier is adapted to advance to the cutter a heel block resting snugly upon the carrier and clamped between the jaws.

9. A machine of the class described having, in combination, a carrier, clamping jaws mounted upon the carrier so as to move with the carrier, the jaws being relatively movable in the direction of the path of travel of the carrier so as to clamp between them a block resting on the carrier, a shoe for holding the block against the carrier during the relative movement of the jaws, and a yielding plunger upon which the shoe is pivotally mounted.

10. A machine as defined in claim 9 in which means is provided for yieldingly resisting pivotal movement of the shoe.

11. A machine as defined in claim 9 in which the shoe is provided with a spring arm on one side of the pivot.

12. A machine for grooving heel blocks having, in combination, a heel-block-grooving cutter, a carrier for advancing heel blocks to the cutter, clamping jaws between which a heel block advanced by the carrier is adapted to be clamped, a spring, means operable as a predetermined position in advance of the cutter and operable through the spring to positively effect the clamping of the block between the jaws, means operable at a predetermined position beyond the cutter for releasing the spring and thereby unclamping the block after it has been acted upon by the cutter, and means whereby the operation of the second-named means upon the spring is rendered more gradual than the operation of the first-named means whereby the jaws are released from the block less suddenly than they are clamped.

13. A machine of the class described having, in combination, a cutter, a carrier, clamping jaws mounted upon the carrier so as to move with the carrier, the jaws being relatively movable in the direction of the path of travel of the carrier to effect the clamping of a block between the jaws, an arm extending beyond and to one side of the carrier, means for actuating the carrier, a spring, a cam located at a predetermined position in the path of travel of the carrier for engaging the arm to effect the relative clamping movement of the jaws in opposition to the force exerted by the spring, and a cam located at a predetermined position beyond the cutter against which the spring is adapted to cause the arm to ride for effecting the unclamping of the jaws, the angle made by the second-named cam with the line of travel of the carrier being less than that made by the first-named cam.

14. A machine of the class described having, in combination, a cutter, a carrier for advancing blocks to the cutter, a jaw stationary with respect to the carrier, a jaw movably mounted upon the carrier to move in the direction of the path of travel of the carrier to clamp a block against the stationary jaw, the movable jaw having a cam face, an arm connected to the movable jaw extending beyond and to one side of the carrier and having a cam adapted to engage the cam face to effect the actuation of the movable jaw, means for actuating the carrier, and means located at a predetermined position in the path of travel of the carrier for engaging the arm to effect the clamping movement of the movable jaw, the arm being movable with respect to the movable jaw, and the arm and the movable jaw being spring-connected together to effect the clamping of blocks of varying dimensions, the spring connection permitting the return of the movable jaw when the arm is advanced beyond the predetermined position.

15. A machine of the class described having, in combination, a cutter, an endless carrier for advancing blocks to the cutter, a plurality of jaws stationary with respect to the carrier, a plurality of jaws movable with respect to the carrier and each adapted to clamp a block against one of the stationary jaws, the stationary and the movable jaws being mounted upon the carrier so as to move with the carrier, means for actuating the carrier, cams movable upon the carrier for actuating the movable jaws, means operable at a predetermined position in advance of the cutter for actuating the cams to effect the actuation of the movable jaws to clamp blocks against the stationary jaws, the jaws having self-alining clamping faces provided with teeth for clamping the blocks irrespective of the dimensions of the blocks, and plates for confining the cams between the carrier and the plates during the movements of the cams upon the carrier.

16. A machine for grooving heel blocks having, in combination, a heel-block-grooving cutter, a carrier comprising a plurality of links, two heel-block clamping jaws mounted upon each link of the carrier so as to move with the carrier, one of each of the said two jaws being stationary with respect to the carrier and the other of each of the said two jaws being movable with respect to the carrier towards the stationary jaw upon another link, the movable jaw having a cam face, a cam adapted to engage the cam face to effect the actuation of the movable jaw, means for actuating the carrier, and means operable during the actuation of the carrier to actuate the cam against the cam face to effect the clamping of a heel block between the jaws, whereby the carrier is adapted to advance to the cutter a heel block resting snugly upon the carrier and clamped between the jaws.

17. A machine for grooving heel blocks having, in combination, a heel-block-grooving cutter, a carrier comprising a plurality of links, two heel-block clamping jaws mounted upon each link of the carrier so as to move with the carrier, one of each of the said two jaws being stationary with respect to the carrier and the other of each of the said two jaws being movable with respect to the carrier towards the stationary jaw upon another link, the said other jaw being normally separated from the said stationary jaw upon the said other link by more than a predetermined distance, means for actuating the carrier, and means operable during the actuation of the carrier to move each movable jaw towards the stationary jaw upon another link so as to diminish the said predetermined distance, thereby to effect the clamping of a heel block between the jaws, whereby the carrier is adapted to advance to the cutter a heel block resting snugly upon the carrier and clamped between the jaws.

18. A machine for grooving heel blocks having, in combination, a carrier, means for actuating the carrier, clamping jaws mounted upon the carrier, whereby the jaws are caused to travel with the carrier from one extreme limit of travel to a second extreme limit of travel, a heel block being adapted to be supported on the carrier between the jaws with a portion of the heel block projecting beyond the jaws at one side of the carrier, means for relatively moving the jaws in the direction of the path of travel of the carrier so as to cause the heel block to become clamped between the jaws with the said portion of the heel block projecting beyond the jaws at the said side of the carrier, and a heel-block-grooving cutter situated between the said limits of travel at the said side of the carrier in the path of travel of the said projecting portion of the clamped heel block, whereby the carrier is adapted to advance the said projecting portion of the clamped heel block to the cutter and the cutter is adapted to cut a groove in the said projecting portion of the clamped heel block.

19. A machine for grooving heel blocks having, in combination, a carrier, means for actuating the carrier, clamping jaws mounted upon the carrier, whereby the jaws are caused to travel with the carrier from one extreme limit of travel to a second extreme limit of travel, a heel block being adapted to be supported on the carrier between the jaws with a portion of the heel block projecting beyond the jaws at one side of the carrier, one of the jaws having self-alining clamping faces, means for relatively moving the jaws in the direction of the path of travel of the carrier so as to cause the heel block to become clamped between the self-alining faces with the said portion of the heel block projecting beyond the jaws at the said side of the carrier, and a heel-block-grooving cutter situated between the said limits of travel at the said side of the carrier in the path of travel of the said projecting portion of the clamped heel block, whereby the carrier is adapted to advance the said projecting portion of the clamped heel block to the cutter and the cutter is adapted to cut a groove in the said projecting portion of the clamped heel block.

20. A machine for grooving heel blocks having, in combination, a carrier, means for actuating the carrier, a four-faced heel block being adapted to be supported on the carrier with a portion of the heel block projecting at one side of the carrier, two means for respectively engaging two opposite faces of the heel block, one of the means being adapted to press the heel block towards the other means to hold the heel block firmly in position, means for engaging the other two opposite faces of the heel block to clamp the heel block on the carrier, and a heel-block-grooving cutter situated at the said side of the carrier in the path of travel of the said projecting portion of the clamped heel block, whereby the carrier is adapted to advance the said projecting portion of the clamped heel block to the cutter and the cutter is adapted to cut a groove in the said projecting portion of the clamped heel block.

In testimony whereof, I have hereunto subscribed my name this 13th day of July, 1923.

WESLEY J. SHAW.